INVENTOR.
WILLIAM G. FREUND
BY Maleson & Ratner
ATTORNEY

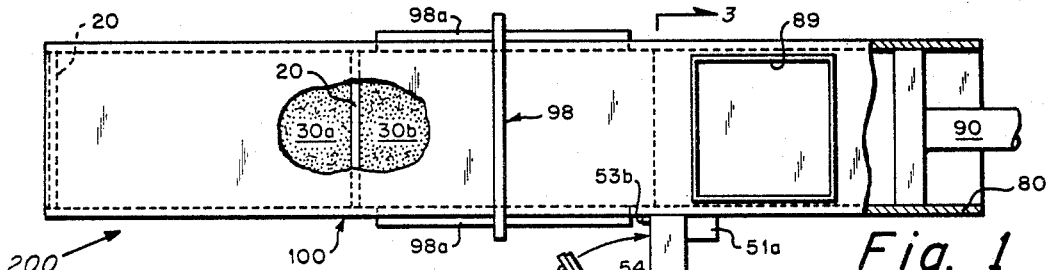
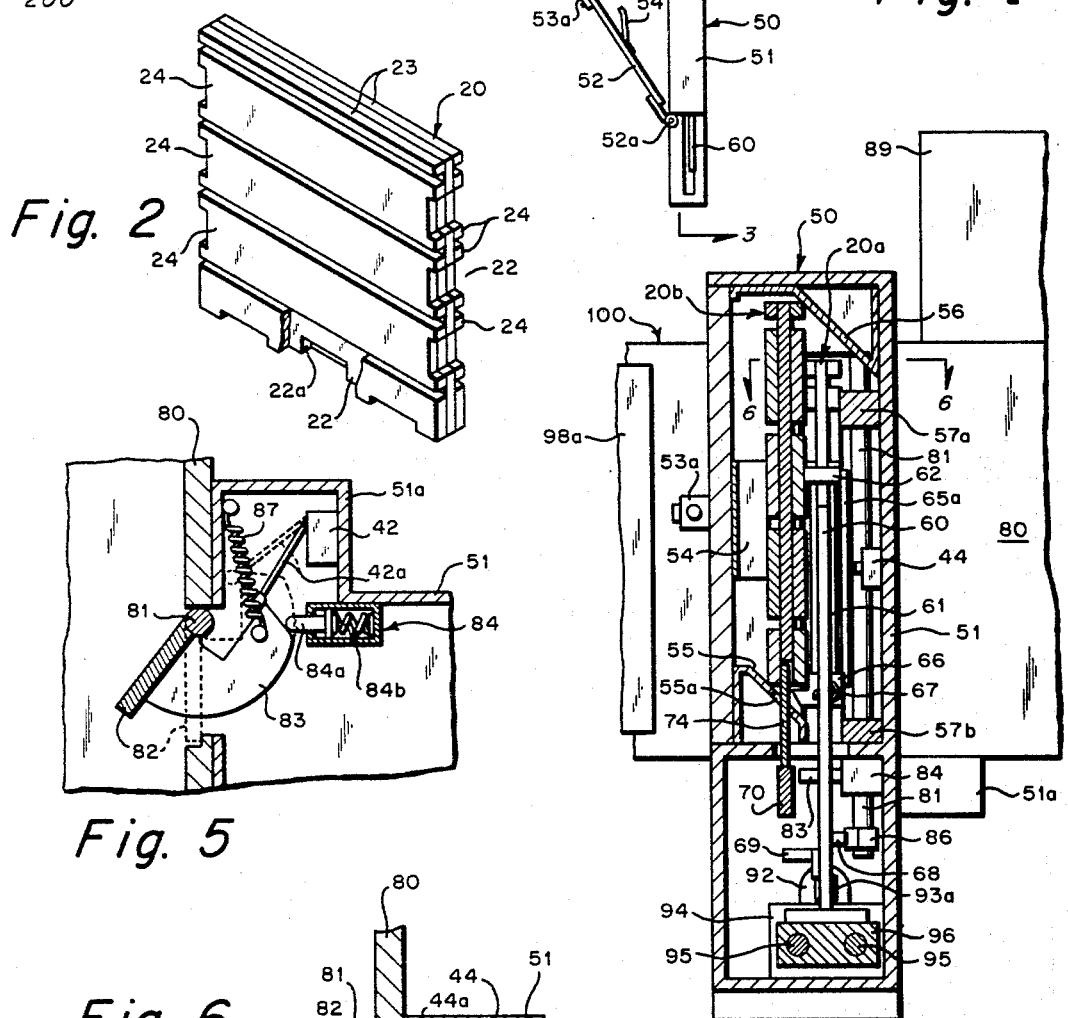
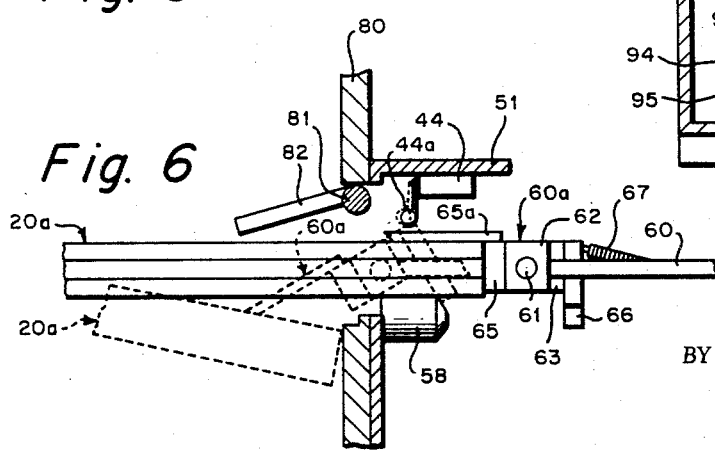

United States Patent Office 3,420,161
Patented Jan. 7, 1969

3,420,161
BALE DIVIDER INSERTER
William G. Freund, Bordentown, N.J., assignor to Hugh F. Munro and Sons Inc., Huntingdon Valley, Pa.
Filed May 15, 1967, Ser. No. 638,498
U.S. Cl. 100—44             9 Claims
Int. Cl. B30b *15/14*

ABSTRACT OF THE DISCLOSURE

An apparatus used with a baling machine to insert dividers between bales as they are formed. A magazine for bale dividers is provided on the side of the baler, and automatically controlled power driven means insert the dividers as required. Jamming of the divider or leakage of the baled material is prevented by the apparatus.

BACKGROUND OF THE INVENTION

*Field of the invention*

Various comminuted or shredded materials, particularly waste paper and paper products, are subjected to extensive handling. This handling usually takes place in furtherance of disposing of these materials as waste. The equipment which handles these materials often include pneumatic or other conveyers, valving means, shredding means, and baling machines. These baling machines compress the material into typically rectangular bales which are then tied to hold them together. Tying means and bale handling means are also in this general related field. It is desirable to provide a solid dividing means between successively formed bales so that the individual bales may be kept distinct. The provision of these bale dividers also facilitates the subsequent tying of the bale.

*Description of the prior art*

It has been known to insert bale dividers manually, and to incorporate bale dividing insertion means with a baling machine using a gravity drop from above, in the waste paper field. In the agricultural field, various type of baling machine attachments, including bale divider inserters have been long known, usually on various types of harvesting machines used in the field. These devices have developed differently and faced different problems because of the nature of the material to be handled and the nature of the type of use. The present invention has particular applicability to the stationary equipment handling comminuted or shredded materials, generally waste paper. It solves certain problems experienced with earlier devices. For example, the divider is inserted and handled with minimized possibility of jamming. It minimizes the possibility of the divider being forced out after insertion by the pressure of the material, or of being unable to be inserted because of material in the way. It minimizes the loss of material during the insertion step. It operates continuously and automatically as long as the baler is running, with its action determined by the condition of the bale and the baling apparatus. It minimizes the possibility of failure to insert a divider. It provides a bale divider particularly suited for subsequent tying and retention of the baled material.

*Summary of the invention*

It is an object of the invention to provide an automatic bale divider inserter for use with baling machines.

It is another object of the invention to provide a bale divider specifically adapted to separate compressed bales of comminuted or shredded material and to provide passages for the transverse provision of tie wires.

It is another object of this invention to provide a bale divider inserter for use with baling machines in which the insertion is power actuated from the side of the bale, a magazine for holding a plurality of dividers to be serially inserted, means to sense the condition of the baling machine and insert a divider at the proper time, means to open and close a side access door at the proper time, and means to cock the divider after insertion to prevent its expulsion.

Other aims and objects are made apparent in the specification and claims.

This apparatus provides a reliable and automatic means for separating formed bales of certain comminuted or shredded materials so that bales are kept separate and so that subsequent tying of the bales may be easily effected. The apparatus is reliable, safe, and automatic in its operation, and is an improvement over earlier bale insertion devices. Some of the advantages of this apparatus over the prior art have been set forth above. The following description, drawings, and claims further set forth the advantages, structure, and operation of the apparatus and its distinction from the prior art, and in the drawings, the same reference numerals identify the same parts.

A bale is made in the usual manner in a conventional horizontal baler. The bale divider inserter permits the baling machine to make bales continuously and automatically by introducing a bale divider or separater automatically between the bales as they are formed.

The bale divider has grooves or slots at each face through which baling wire later is passed, wrapped around the bale and tied off. The present general practice is to manually tie off the bales. A formed bale must be maintained within a body of the baler until it is tied off. Therefor, one advantage of the present invention is that the number of bales which can be made before an operator has to return to the machine and perform manual operation is limited only by the length of the baler at the output end and by the number of bale dividers that are held in the bale divider inserter. This advantage reduces labor costs, since the operator may spend more productive time elsewhere.

Another advantage is that a faster overall baling operation is obtained. This is because it is not necessary to stop the baling machine and discontinue the operation while the bales are being tied off. It is possible to tie the bales off while the machine is in operation and there is not even a loss of time in reloading the divider magazine, since this can be reloaded while the baler is in operation.

*Brief description of the drawing*

FIGURE 1 is a plan view, partially fragmented, partially in section, of the entire baling machine, including the bale divider inserter;

FIGURE 2 is a perspective view, partially in section, of a bale divider;

FIGURE 4 is a cross-sectional view taken along the line 4—4 of FIGURE 3*b*.

FIGURE 5 is a cross-sectional fragmentary view taken along the line 5—5 of FIGURE 3*a*; and FIGURE 6 is a cross-sectional view, with certain parts removed for better showing, taken along lines 6—6 of FIGURE 4, and showing an alternate position in phantom lines.

*Description of the preferred embodiment*

Figure 3A:
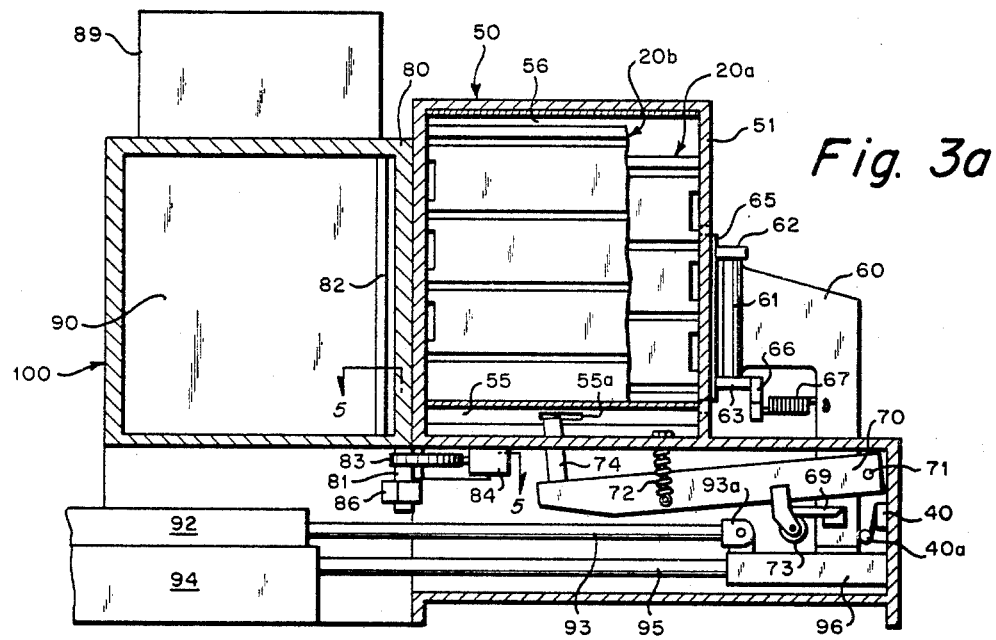
FIGURE 3*a* is a cross-sectional view taken along the line 3—3 in FIGURE 1, showing the inserter actuation mechanism in retracted position.

A baling machine generally designated 200 is best initially considered in connection with FIGURE 1. At the righthand is shown the baling ram 90 which compresses the material through strokes to the left. A filling chute supplies the material to the baler for baling, in accord with known conventional structure. In FIGURE 1, the filling chute 89 is shown at the point at which it enters the top of the baler through a rectangular access port. The ram 90 travels from a retracted position, as shown, leftward under the chute, to a position to the left of the chute. In the specification, positions to the leftward as viewed in FIGURE 1 are referred to as forward positions, and positions to the right are referred to as rearward positions. The ram 90 may for example progress forward to the first transverse dotted line in FIGURE 1 as its forward position.

Forward of the chute is a baling chamber generally designated 100. The baling chamber conventionally includes means to exert pressure on the sides or the top and bottom of the bales within it. Conventionally, compressive devices of various types have been used to provide a choke effect. The details of these compressive devices, and of the horizontal baling machine itself, are not a subject of this invention. Therefor, there is a simplified showing of the choke device in FIGURE 1. This includes a pair of side compressing units 98a, linked with a compressing force means 98. This compressing force means may for example be a hydraulic cylinder which exerts a pre-selected force tending to draw the compressing units 98a together against the sides of the formed bales.

Part of the top of the baler 200 is fragmented away in FIGURE 1 show views of two successive bales 30a and 30b. These bales are separated by a bale divider 20. Another bale divider 20 is shown at the forward end of bale 30a. Bale 30a must be tied off before the ram advances all the contents of the baler further. The conventional baler has an open-work type of side, such as separate rails or plates, so that access can be had to the bales. Wires are passed around the ends of the bale 30a, between the bale dividers 20 and the bale itself, and are tied off. Then, a completed and tied bale may be expelled from the machine.

The bale divider inserter is generally designated 50. It is provided on one side of the baler 200, forward of the filler chute 89.

The bale divider 20 is best described in connection with FIGURE 2. It includes a center panel 22 and outside panels 24 on both sides of center panel 22. It is important to provide deep horizontal, parallel grooves between the outside panel sections 24 on each side. These grooves may be provided by affixing a single panel 24 on each side and then routing out a plurality of grooves, or individual smaller side panels, such as are each identified with numeral 24, may be individually affixed. Preferably, the panels are made of marine fir plywood and are affixed together with contact cement or equivalent means. A pair of top strips 23 are provided on the divider 20. Other materials may be used for the dividers.

The bottom of divider 20 shown in FIGURE 2 is partly fragmented to show a structural detail at the bottom center of the center panel 22. This is a notch 22a, and serves a function described in more detail below. The sides and bottom of the divider 20 are preferably provided with indentations clearly shown in FIGURE 2. The purpose of these indentations is to provide clearance of the rails that form a part of the baling chamber.

Figure 3B:
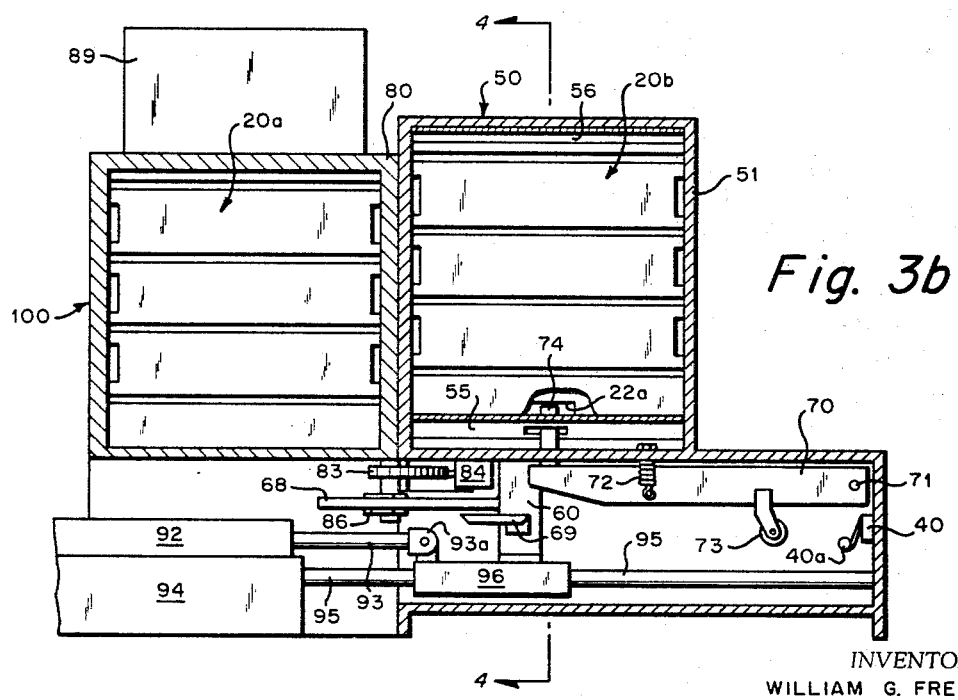
FIGURE 3*b* is a cross-sectional view taken along the line 3—3 of FIGURE 1, showing the bale insertion actuation mechanism in its full forward position.

The general structure of the bale divider mechanism itself is best initially understood in connection with FIGURES 1, 3a and 3b. FIGURE 3a is a view taken along line 3—3 of FIGURE 1 with the pusher in a retracted position. The baling chamber walls 80 are here shown schematically. These walls are solid at this point, and the compressing means 98, 98a as described starts forward of this point and the walls are thereafter no longer the solid unit 80 as shown in FIGURE 3a. The inserter 50 includes a mazagine 51. This magazine may hold a plurality of bale dividers in a substantially vertical position.

A divider 20b is in the magazine in storage position and a divider 20a is shown in position ready to be inserted into the baling chamber 100. Divider 20b is partly fragmented to reveal divider 20a behind it. Divider 20a is at a lower level than divider 20b, and this is explained in more detail below in connection with FIGURE 4.

The pusher actuation means comprises elements generally positioned below the magazine and described as follows. An hydraulic cylinder 92 is positioned transverse to the major direction of the baler 200, and is beneath it. An actuation rod 93 extends from cylinder 92 to clevis 93a. This clevis is connected to pusher base 96.

Pusher base 96 is free to move along base support rod 95. This base support rod extends from the support block 94 substantially parallel to and below the actuator rod 93, and is fixed at the outer end to the frame of the inserter 50. It is thus apparent that operation of hydraulic cylinder 92 can selectively move pusher base 96 along its support 95. The extreme positions of this travel are shown respectively in FIGURES 3a and 3b.

A pusher 60 is mounted on and above the pusher base 96, and moves therewith. The pusher incorporates a pivoted nose. Only part of the pivoted nose structure is shown in FIGURE 3a. This includes a top bushing 62, a bottom bushing 63, and a pivot shaft 61 riding in the two bushings. A trip finger 66 is connected to the pivoting nose piece, which in turn is connected to the pivot shaft 61. Trip finger 66 is provided with a spring 67, normally in tension and pulling the trip finger 66 toward the upright portion of pusher 60, to which the spring is attached.

Part of the nose piece, the pusher block 65, is visible in FIGURE 3a. The structure and operation of the nose piece is explained in more detail below principally in connection with FIGURE 6.

A locking bar 70 is provided below the magazine. This locking bar is mounted for vertical pivoting motion around locking bar pivot pin 71. A latch 74 extends upwardly from locking bar 70, at the end thereof remote from the pivot 71. The latch 74 is positioned generally transversely centrally with respect to the magazine 51. A locking bar spring 72 is provided on locking bar 70, and is affixed to the frame of the inserter 50. The spring 72 is normally in tension, and tends to pull the locking bar to its uppermost position. The uppermost position of course raises the latch 74 to its uppermost position, in which it penetrates deeply into the bottom of the magazine.

A locking bar actuation cam 69 is provided on the upright portion of pusher 60. A cam follower 73 is provided on the locking bar 70, and as can be seen from FIGURES 3a and 3b, cam 69 coacts with cam follower 73 upon horizontal motion of the pusher 60. In FIGURE 3a, with the pusher actuation means in the retracted position, cam 69 has contracted cam follower 73, which is preferably a rolling member, and has depressed it and hence has depressed locking bar 70. This in turn pulls down the latch 74. As the pusher actuation means moves to the left or inserting position, as shown in FIGURE 3, the cam 69 clears the cam follower 73, and spring 72 then pulls locking bar 70 to its raised position, and thus raises the latch 74. The latch, in its raised position, enters the bale divider notch 22a as best shown in the fragmented portion in FIGURE 3b. Bale divider 20b is thus of course prevented from motion while latch 74 is present in notch 22a. A door 82 is provided in the side of wall 80 of the baling chamber 100. This will extends vertically a sufficient distance to accomodate the vertical dimension of a bale divider, and is supported on door hinge 81. The other structure in connection with the door is best explained in connection with FIGURES 5 and 6.

In FIGURE 3b, the pusher actuation means have moved to its inserted position, and is seen that bale divider 20a has ben pushed by pusher 60 and its associated elements into the interior of the baling chamber 100. The stored bale divider 20b still remains in the magazine. A door opening finger 68 is provided on and extends horizontally from the upright portion of the pusher 60, below the level of the magazine. The finger 68 is hidden behind the locking bar in FIGURE 3a, but is shown in FIGURE 3b. In FIGURE 3b, the finger 68 has moved to the left and has contacted the door opening cam 86, which is attached to the hinge pin of the door 82. By striking and pushing the door opening cam 86, the finger 68 opens the door 82. In FIGURE 3b, the door 82 is not visible, because it is behind the inserted bale divider 20a, but further details of the operation of the door are described below.

The magazine as illustrated contains two bale dividers, although it is understood that it may be physically extended further to contain more than two such dividers. The magazine 51 is provided with a magazine door 52, as best shown in FIGURE 1. This is hinged on hinge 52a. Coacting door latch means 53a and 53b are respectively provided on the door and on the magazine so that the door may be latched shut. These latch means may be conventional. A leaf spring 54 is affixed to the inside of the door 52, and it is apparent that when door 52 is shut and latched, the leaf spring 54 presses against the next adjacent bale divider 20 and tends to hold it in its proper upright position, as well as tending to urge it further into the insertion position of the magazine. The magazine 51 has a small extension 51a extending against and under the body of the baler 200, and useful as part of the attaching and positioning structure, but is not in itself an important structural part of the invention.

The positioning of the bale dividers within the magazine, and certain other structure is further best described in connection with FIGURE 4. FIGURE 4 is a cross-sectional view taken along line 4—4 of FIGURE 3b. It is seen that the pusher base 96 rides on a pair of horizontally parallel base support rods 95 to provide greater stability than a single such rod would provide. The relationship of the finger 68, the door opening cam 86 and the door hingle 81 are further exemplified at the lower right-hand portion of FIGURE 4. The orientation and interrelationship of other elements described above are also further shown in this figure. The magazine 51 contains within it a bottom guide 55 and a top guide 56, arranged as shown. These are upper and lower guide members for the bale dividers contained within the magazine, and are provided with substantially parallel sloping surfaces. The slope is downward from left to right, that is, from the magazine door 52, downward toward the insertion position. Part of divider 20a is shown in FIGURE 4. This divider has gone to the insertion position and has been inserted. Divider 20b is shown in the stored position, where it is being held between the top and bottom guides 56 and 55 respectively, and is being urged to the right by spring 54. The latch 74 on locking bar 70, as has been described, is here inserted into the notch in divider 20b. A latch access aperture 55a is provided through bottom guide 55 to permit the insertion of latch 74. Thus, latch 74 prevents the divider 20b from sliding down the guides to the right. The existence of the sloping guides explains the vertical displacement of bale dividers 20a and 20b as shown in FIGURE 3a. Upper and lower guide blocks 57a and 57b respectively are provided inside the magazine at the righthand side to provide limits or stops for the bale divider in the inserted position within the magazine.

The construction of the nose piece and its coacting and associated elements are best shown in FIGURE 6 which is taken along line 6—6 of FIGURE 4. The door 82 is provided in the baling chamber wall 80. The solid line showing in FIGURE 6 illustrates a divider 20a almost but not completely inserted into the baling chamber. It enters through the opening in chamber wall 80 made by door 82 which is here shown pivoted around its hinge 81 to its full open extent. As described above, the door opening finger 68 has opened door 82 by operating door opening cam 86.

The pusher 60 carries the pivoted nose piece 60a which pivots around pivot shaft 61. The pivoted nose piece includes the pusher block 65 which bears directly against the outer edge of the bale divider 20a, and serves to push the bale divider into the chamber. A cocking arm 65a is affixed to the pusher block and extends from it in the direction of the face of the bale divider 20a. It is positioned so that when the pusher block 65 is against the edge of the bale divider 20a, the cocking arm 65a is against the rear face of the bale divider.

A kicker block 58 is provided on the exterior of wall 80. As was described, the pivoted nose piece includes a trip finger 66 extending therefrom substantially at right angles to the direction of extension of the cocking arm 65a. As the pusher 60 moves further to the left, that is, to its inserted position, the trip finger 66 contacts kicker block 58. The phantom line showing in FIGURE 6 illustrates the nose piece of the pusher and the bale divider 20a when the pusher has reached its full inserted position, that is, the position as shown in FIGURE 3b. The kicker block 58 has been contacted by trip finger 66, and the continued leftward motion of the pusher 60 has caused the kicker block to provide a turning moment of the pivoted nose piece 61. This causes the cocking arm 65a to push against the rear flat surface of the bale divider 20a, and to push it forward of the door opening so that it is cocked. The purpose of this is explained below.

Another detailed aspect of elements associated with the door 82 is best illustrated in FIGURE 5. This is a view in the same direction and from the same position in a horizontal plan as FIGURE 6, but is taken below the vertical plane as viewed in FIGURE 6. A closing cam 83 is provided on the door hinge 81. The vertical location of this cam can be understood from FIGURES 3a, 3b and 4. A cam follower box 84 is provided on the interior of the magazine 51. It contains a cam follower 84a and a resistance spring 84b.

A door closing spring 87 is affixed between the magazine structure and the cam. It is seen that the door closing spring 87, normally in tension, tends to rotate door 82 to its closed position. The situation in FIGURE 5 is shown after the pusher has been withdrawn to the right. The spring 87 then acts to close the door to its partially open position as shown in FIGURE 5. The door stops at this position when the flat surface of cam 83 strikes against cam follower 84. The force of resistance spring 84b is chosen or adjusted so that enough resistance is applied against cam 83 through cam follower 84a to hold the door in the position shown. The purpose for this partial closing is explained further below.

The resistance of resistance spring 84b may be overcome by an additional closing force exerted against the door. This additional force comes from the pressure of the next advancing material to be baled, as the ram 90 starts its next forward stroke. The material to be baled presses against door 82 and shuts it completely against the resistance of resistance spring 84b. It is seen that when the door shuts completely, cam follower 84a rides over the curved surface of closing cam 83. The door and cam in the completely closed position are shown in phantom lines in FIGURE 5. Note that a notch is provided in the internal side of wall 80 to accommodate the thickness of door 82, so that in the completely closed position the door is flush with the wall 80.

There are a number of limit switches and limit switch actuators at various positions in the apparatus. These switches are connected to provide certain circuit opening or closing functions in accord with conventional simple electric switch means. The description of the switches and actuators is best understood in connection with a description of the operation of the apparatus, since the switches function at various stages during the operation cycle.

Ram 90 moves through a series of strokes, carrying material which is entering the baling chamber through chute 89 forward of the chute, and compacts it. As new material enters the baling chamber through the chute, the ram continues to reciprocate until a bale of the proper desired length is formed. The sensing and control devices to carry out these operations are conventional in horizontal baling machines. For example, sensing devices such as photocells may sense the presence of enough material having come through the chute in order to have the ram move forward, and conventional limit switches govern the forward and backward extent of travel of the ram. Known measuring devices such as toothed wheels may remain in contact with the surface of a bale being formed, and a predetermined amount of revolution of the toothed wheel indicates that a bale of the predetermined length has been formed. Conventionally, when this happens, the ram may come to a stop at a full forward position so that the operator may tie off the bale, as has been described. All these controls are known and conventional.

In the present invention, the only difference in the behavior of the ram when a bale of the proper length has been formed is that conventional circuitry causes the ram to retract partially so that it just uncovers the door 82, but does not uncover any portion of the chute 89. A limit switch in the baling chamber is preferably positioned at exactly this point. The actuation of this limit switch by the ram retracting to this point, after the toothed wheel, for example, has indicated a bale of the proper length has been formed, stops the ram, as explained, and also diverts hydraulic fluid flow from the cylinder of ram 90 to the bale divider inserter cylinder 92, thus starting the bale divider insertion cycle.

The hydraulic cylinder 92, thus actuated, moves the pusher from the position of FIGURE 3a to the position of FIGURE 3b, inserting bale divider 20a between the rear end of the last formed bale 30b and the front face of the ram 90. When the pusher 60 has reached the full insertion position, it will be seen from FIGURE 6 that the limit switch actuator 44a is contacted and operates switch 44. The operation of this limit switch 44 reverses the flow of hydraulic fluid in cylinder 92, and moves the pusher back to its retracted position of FIGURE 3a. The retracted position is sensed by limit switch actuator 40a which operates limit switch 40. This limit switch cuts off hydraulic flow to the cylinder 92, and directs the flow back to the cylinder of ram 90. Ram 90 now resumes its conventional cycle, retracting to admit more material through chute 89, and thence resuming its series of compression strokes if there is material available to be compressed.

As has been described in connection with FIGURE 5, as the pusher 60 retracts to the right after having inserted the divider, the door 82 starts to close. When the partially closed or holding position of FIGURE 5 is reached, as has been described, the limit switch actuator 42a is actuated by being struck by cam 83, and operates switch 42. This is a safety device. If the bale divider 20a has not been completely inserted, as might happen because of the presence of blocking material on the area into which it moves for example, the door 82 will not be able to close to the position to actuate the switch 42. Thus, damage to the equipment is prevented.

The divider 20a is cocked forward as shown and described in connection with FIGURE 6, by cocking arm 65a, to prevent the divider from accidentally being expelled as the pusher 60 starts to retract. The possibility of such an expulsion arises because of the resilient effect of some of the material to be compacted which may exist in the area into which the bale divider moves. After the ram retracts to permit insertion of the bale divider, it is the internal friction of the compacted material at the rear face of the bale which prevents it from following the ram backward, and there is always the possibility of at least some material nevertheless falling into the divider area.

In addition to the cocking step, and the door closing sensing switch, another means is provided to prevent the bale divider from being displaced. The door 82, pulled by spring 87 to its partially closed position as shown in solid lines in FIGURE 5, acts as a prop or stay behind the inserted divider. This prevents the divider from topling backwards. It is apparent that when the ram begins to retract, there is the possibility of the inserted divider falling over toward the ram. The partially closed door 82 prevents this. Thus, the provision and structure of the door serves a number of functions, including an access way for the divider insertion, means to prevent accidental loss of the compacted material at this point during the compaction steps, a holding of the divider in its proper vertical position against the rear face of the bale, and a prevention of the divider from topling backwards.

A limit switch is also provided in the magazine to sense the presence of at least one divider in the magazine. This limit switch may be for example on one of the blocks 57a or 57b. When this magazine limit switch shows that no dividers are present, the loading cycle continues to form a bale, but stops before a full bale has been made. Preferably, at this point, a signal is made to the operator to instruct him to tie off the bales and insert additional dividers in the magazine. Another preferable limit switch is one which is positioned for example on the latch 53b and serves to halt the operation of the pusher in either direction when the magazine door 52 is open. This is a personnel safety device.

The spring 54 in the magazine, serves the function, as has been described, of urging the dividers into position for insertion. It also serves the function of pressing the dividers in the magazine against the magazine limit switch so as to give a positive indication of the presence or absence of such a divider.

The description of the latch 74 on the locking bar 70 has been described in connection with FIGURES 3a, 3b, and 4. It will be appreciated from the described structure of the machine that as the pusher 60 is in the process of inserting a divider 20b into the baling chamber, the latch 74 holds the stored divider 20b in place so that it cannot interfer with the operation of the mechanism. When the pusher 60 has retracted to the FIGURE 3a position, the latch releases the stored divider and permits the force of spring 54, and the operation of gravity along the sloped bottom guide 55 to move the stored divider into the insertion position.

The scope of this invention is to be determined by the appended claims, and is not to be limited to the foregoing description and drawings which are illustrative.

I claim:

1. A bale divider inserter to insert bale dividers into the chamber of a comminuted material baling machine, having a filling chute, said inserter being positioned at one side of said chamber and forward of said filling chute, comprising
   (a) a magazine, said magazine adapted to hold a plurality of bale dividers, said magazine having both a stored divider section and an insertion divider section,
   (b) a door in the side of said baling chamber, forward of said chute, said door being aligned with said magazine insertion divider section, said door being provided with a hinge and having a plurality of positions,
   (c) a pusher, and means to support said pusher for travel through said insertion divider section of said magazine and a pivoted nose piece on said pusher, and
   (d) pusher actuation means to move said pusher through said magazine to and from a retracted position and an insertion position.

2. A bale divider inserter as set forth in claim 1 wherein said magazine is provided with internal top and bottom guides, said guides sloping downwardly from said stored divider section to said insertion divider section, and being spaced to accommodate a bale divider placed vertically therebetween.

3. A bale divider inserter as set forth in claim 1 wherein a bale divider latching means is provided on said inserter below said magazine, said latching means including a latch movable upwardly into said magazine, means to move said latch downwardly from said magazine when said pusher is in said retracted position, and means to move said latch upwardly into said magazine when said pusher is out of said retracted position.

4. A bale divider inserter as set forth in claim 1 wherein said pivoted nose piece on said pusher is provided with a pusher block adapted to engage the edge of a bale divider in said insertion divider section, and a cocking arm extending from said nose piece and adapted to engage the rear face of a bale divider in said insertion divider section, and a trip finger extending from said pivoted nose piece, a kicker block on said baling machine, positioned to be engaged by said trip finger as said pusher approaches said insertion position, said engagement rotating said pivoted nose piece.

5. A bale divider inserter as set forth in claim 4 wherein said kicker block is so positioned that when said pusher is fully in said insertion position, said pivoted nose piece is rotated to an extent that said cocking arm pushes at least part of said bale divider forward of the opening for said door, and wherein a spring is affixed to said pivoted nose piece to tend to rotate said nose piece against the direction of rotation caused by said kicker block and said trip finger.

6. A bale divider inserter as set forth in claim 1 wherein said door hinge is provided with a door opening cam, and a door opening finger was provided on said pusher, said door opening finger engaging said cam and opening and holding open said door as said pusher moves from retracted position to said insertion position.

7. A bale divider inserter as set forth in claim 1 wherein said door hinge is provided with a closing cam, a spring is provided to tend to close said door, a cam follower is provided on said inserter, adjacent to said closing cam, said cam follower having a resistance spring behind it, said closing cam contacting said cam follower and pushing against said resistance spring, when said door is partially closed.

8. A bale divider inserter as set forth in claim 7 wherein said resistance spring has a force selected so that the pressure of said cam follower against said closing cam holds said door partially closed against the closing pull of said spring provided to close said door, and selected so that an additional closing force on said door overcomes the resistance of said resistance spring and permits said door to fully close.

9. A bale divider inserter as set forth in claim 8 wherein said inserter includes a limit switch and a limit switch actuator adjacent said closing cam, said actuator being contacted by said closing cam and operating said switch when said door closes to said partly closed position, said switch being operatively connected to said baling machine to prevent the operation of said baling machine unless said switch has been actuated.

References Cited

UNITED STATES PATENTS

| | | | |
|---|---|---|---|
| 1,246,569 | 11/1917 | Edmonson | 100—183 |
| 1,412,021 | 4/1922 | Welger | 100—44 |
| 3,024,719 | 3/1962 | Englund | 100—44 |

BILLY J. WILHITE, *Primary Examiner.*

U.S. Cl. X.R.

100—53, 183, 184